United States Patent
Stockhammer

(10) Patent No.: US 12,375,740 B2
(45) Date of Patent: *Jul. 29, 2025

(54) METHODS AND APPARATUS TO FACILITATE USING A STREAMING MANIFEST INCLUDING A PROFILE INDICATION

(71) Applicant: QUALCOMM Incorporated, San Diego, CA (US)

(72) Inventor: Thomas Stockhammer, Bavaria (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/759,502

(22) Filed: Jun. 28, 2024

(65) Prior Publication Data

US 2024/0356999 A1 Oct. 24, 2024

Related U.S. Application Data

(63) Continuation of application No. 18/306,188, filed on Apr. 24, 2023, now Pat. No. 12,052,305, which is a
(Continued)

(51) Int. Cl.
*H04N 21/235* (2011.01)
*H04L 65/612* (2022.01)
(Continued)

(52) U.S. Cl.
CPC ....... *H04N 21/2353* (2013.01); *H04L 65/612* (2022.05); *H04L 65/65* (2022.05);
(Continued)

(58) Field of Classification Search
None
See application file for complete search history.

(56) References Cited

U.S. PATENT DOCUMENTS 11,695,817 B2 7/2023 Stockhammer
2011/0320559 A1 12/2011 Foti
(Continued)

FOREIGN PATENT DOCUMENTS

CN 105308978 A 2/2016
CN 108702527 A 10/2018
(Continued)

OTHER PUBLICATIONS

Dijk B.V., "New in HTTP Live Streaming (HLS): Common Media Application Format—Unified Streaming", Posted at http://www.unified-streaming.com/blog/new-http-live-streaming-hls-common-media-application-format (May 20, 2022) on Jul. 13, 2016, 8 Pages.
(Continued)

*Primary Examiner* — Scott B Christensen
(74) *Attorney, Agent, or Firm* — Arent Fox, LLP

(57) ABSTRACT

The present disclosure relates to methods and devices for facilitating using a streaming manifest including a profile signal for content encoded based on a encapsulation format. An example method disclosed herein includes identifying structures associated with first media, wherein the first media is associated with a first streaming format. The example method also includes generating a streaming manifest for the first media, wherein the streaming manifest maps the structures associated with the first media to structures associated with a second streaming format, and including an indication with the streaming manifest, wherein the indication identifies the streaming profile used to map the structures.

42 Claims, 5 Drawing Sheets

Related U.S. Application Data continuation of application No. 16/822,613, filed on Mar. 18, 2020, now Pat. No. 11,695,817.

(60) Provisional application No. 62/821,216, filed on Mar. 20, 2019.

(51) Int. Cl.
   *H04L 65/65*   (2022.01)
   *H04L 65/70*   (2022.01)
   *H04L 65/75*   (2022.01)
   *H04L 67/02*   (2022.01)
   *H04L 67/30*   (2022.01)

(52) U.S. Cl.
   CPC .............. *H04L 65/70* (2022.05); *H04L 65/75* (2022.05); *H04L 67/02* (2013.01); *H04L 67/30* (2013.01)

(56) References Cited

U.S. PATENT DOCUMENTS

| | | |
|---|---|---|
| 2014/0281009 A1 | 9/2014 | Moorthy et al. |
| 2016/0006817 A1 | 1/2016 | Mitic et al. |
| 2018/0288500 A1 | 10/2018 | Stockhammer |
| 2019/0036995 A1 | 1/2019 | Zhang |
| 2019/0075148 A1 | 3/2019 | Nielsen et al. |
| 2019/0104316 A1 | 4/2019 | Da Silva Pratas Gabriel et al. |
| 2019/0132627 A1 | 5/2019 | Loheide et al. |
| 2020/0304554 A1 | 9/2020 | Stockhammer |
| 2023/0262104 A1 | 8/2023 | Stockhammer |

FOREIGN PATENT DOCUMENTS

| | | |
|---|---|---|
| EP | 3306885 A1 | 4/2018 |
| WO | 2012010928 A1 | 1/2012 |

OTHER PUBLICATIONS

Hughes K., et al., "Common Media Application Format for Segmented Media", International Organisation for Standardisation, 29N159922, 3rd Generation Partnership Project, Mobile Competence Centre, 650, Route Des Lucioles, F-06921 Sophia-Antipolis Cedex, France, vol. SAWG4, No. Sophia Antipolis, France; Jun. 29, 2016 (Jun. 29, 2016), JTC1/SC29/WG11, 110 Pages, XP051122443.

International Preliminary Report on Patentability—PCT/US2020/023579, The International Bureau of WIPO—Geneva, Switzerland, Sep. 30, 2021.

International Search Report and Written Opinion—PCT/US2020/023579—ISA/EPO—Jun. 8, 2020.

Pantos R., et al., "Delivering CMAF Content with HLS", 121. MPEG Meeting, Jan. 22, 2018-Jan. 26, 2018, Gwangju, (Motion Picture Expert Group or ISO/IEC JTC1/SC29/WG11), No. M42037, Jan. 17, 2018 (Jan. 17, 2018), XP030070379, 9 pages, the whole document.

Qualcomm Incorporated: "Dash Service Description", Iso/Iec JTC1/SC29/WG11 MPEG2018/M44861, No. M44861, Oct. 3, 2018 (Oct. 3, 2018), XP030192127, 7 pages, Retrieved from the Internet: URL: http://phenix.int-evry.fr/mpeg/doc_end_user/documents/124_Macao/wg11/m44861-V1-Service-Description.zip. Service-Description.docx. [retrieved on Oct. 3, 2018] the whole document.

"WD of ISO/IEC TR 23009-7 Delivery of CMAF Contents with DASH", 123. MPEG Meeting, Jul. 16, 2018-Jul. 20, 2018, Ljubljana, (Motion Picture Expert Group or ISO/IEC JTC1/SC29/WG11), No. N17866, Jul. 20, 2018 (Jul. 20, 2018), XP030197590, 22 pages, p. 4, paragraph 6.2—p. 7, paragraph 8 p. 14, paragraph 9—p. 15.

METHODS AND APPARATUS TO FACILITATE USING A STREAMING MANIFEST INCLUDING A PROFILE INDICATION

CROSS REFERENCE TO RELATED APPLICATION(S)

This application claims the benefit of U.S. Provisional Application Ser. No. 62/821,216, entitled "Methods and Apparatus to Facilitate Using a Streaming Manifest Including a Profile Signal for CMAF Content" and filed on Mar. 20, 2019, and is a continuation of U.S. application Ser. No. 16/822,613, entitled "Methods and Apparatus to Facilitate Using a Streaming Manifest Including a Profile Indication" and filed on Mar. 18, 2020, issued Jul. 4, 2023 as U.S. Pat. No. 11,695,817, and U.S. application Ser. No. 18/306,188, entitled "Methods and Apparatus to Facilitate Using a Streaming Manifest Including a Profile Indication" and filed on Apr. 24, 2023, each of which are expressly incorporated by reference herein in their entirety.

BACKGROUND

Technical Field

The present disclosure relates generally to media systems, and more particularly, to one or more techniques for using a streaming manifest including a profile indication for content encoded based on a streaming format or an encapsulation format.

Introduction

In streaming media, a streaming format (e.g., an encapsulation format) may be used to structure the media to be streamed into accessible, addressable content. The addressable content may be stored on a server to be accessed for playback by streaming clients. However, the streaming clients may operate based on second streaming formats with structures different from the first streaming format, and different streaming clients may utilize different structures. Storing content in different structures for access using different streaming formats uses additional resources for translating the content into the different structures and uses additional storage space for storing the content multiple times in different structures.

Common Media Application Format (CMAF), as defined in ISO/IEC 23000-19 is an example of an encapsulation format. CMAF defines structural relationships of CMAF Tracks, CMAF Fragments, CMAF Segments, and other CMAF structures (or functionalities), but does not provide a manifest for expressing these structural relationships. CMAF also does not provide a manifest for using CMAF for streaming purpose.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Techniques disclosed herein provide a Dynamic Adaptive Streaming over HTTP (DASH) profile for Common Media Application Format (CMAF) Content, as defined in ISO/IEC 23000-19. While CMAF content (e.g., media such as audio, video, images, etc.) may be delivered with DASH structures, the CMAF content is expected to be delivered without modification and/or transcoding to the CMAF content. Thus, it may be beneficial to provide a mapping of CMAF content to DASH structures to, for example, provide consistency to content authors generating the CMAF content for streaming delivery and/or to media playback platform developers for consuming the CMAF content.

In some aspects of the disclosure, a method, a computer-readable medium, and an apparatus are provided. In one example, an apparatus disclosed herein identifies structures associated with first media. In some examples, the first media may be associated with a encapsulation format. The example apparatus also generates a streaming manifest for the first media. In some examples, the streaming manifest may map the structures associated with the first media to structures associated with a streaming format. The example apparatus also includes a profile indication such as a profile signal in the streaming manifest. In some examples, the profile indication may identify the streaming profile used to map the structures associated with the first media to the structures associated with the streaming format.

In some aspects of the disclosure, a method, a computer-readable medium, and an apparatus are provided. In one example, the apparatus disclosed herein identifies structures associated with first media, wherein the first media is associated with a first streaming format, generates a streaming manifest for the first media, wherein the streaming manifest maps structures associated with the first media to structures associated with a second streaming format, and includes an indication with the streaming manifest, wherein the indication identifies the streaming profile used to map the structures associated with the first media to the structures associated with the second streaming format.

In some aspects, the mapping of the structures associated with the first media to the structures associated with the second streaming format may be based on a set of information included in a streaming profile.

In some aspects, the set of information may be a set of rules.

In some aspects, the streaming manifest may be used to create a media presentation, and wherein segments of the media presentation conform to the streaming format.

In some aspects, the indication may be a profile signal.

In some aspects, the indication may be in the streaming manifest.

In some aspects, the first streaming format may be at least one of an encapsulation format, a packaging format, or a common media application format (CMAF).

In some aspects, the streaming manifest may correspond to a Dynamic Adaptive Streaming over HTTP (DASH) media presentation description (MPD), the streaming profile may correspond to a DASH profile, or a streaming MPD may correspond to a DASH MPD.

In some aspects, the streaming manifest may correspond to at least one of an HTTP Live Streaming (HLS) manifest, the streaming profile may correspond to an HLS profile, or a streaming MPD may correspond to an HLS MPD.

In some aspects, the streaming profile may correspond to a set of constraints for mapping the structures associated with the first media to the structures associated with the streaming format.

In some aspects, the identifying of the structures associated with the first media may be based on using a second streaming manifest that includes a second profile signal.

In some aspects of the disclosure, a method, a computer-readable medium, and an apparatus are provided. In one example, the apparatus disclosed herein receives, at a streaming client, a streaming manifest associated with playback of streaming media, wherein the streaming manifest is associated with a first streaming format and the streaming media is associated with a second streaming format, wherein the streaming manifest maps structures associated with the first streaming format to structures associated with the second streaming format; receives, at the streaming client, an indication with the streaming manifest, the indication identifying the streaming profile used to map the structures associated with the first streaming format to the structures associated with the second streaming format; identifies the structures associated with the streaming media based on the streaming manifest, the streaming profile, and the indication; and performs playback of the streaming media based on the identified structures associated with the streaming media, wherein the playback of the streaming media is in accordance with playback rules associated with the second streaming format.

In some aspects, the mapping of the structures associated with the first streaming format to the structures associated with the second streaming format may be based on a set of information included in a streaming profile.

In some aspects, the set of information may be a set of rules.

In some aspects, the indication may be a profile signal.

In some aspects, the indication may be in the streaming manifest.

In some aspects, the first streaming format may be at least one of an encapsulation format, a packaging format, or a common media application format (CMAF).

In some aspects, the streaming manifest may correspond to a Dynamic Adaptive Streaming over HTTP (DASH) media presentation description (MPD), the streaming profile may correspond to a DASH profile, or a streaming MPD may correspond to a DASH MPD.

In some aspects, the streaming manifest may correspond to an HTTP Live Streaming (HLS) manifest, the streaming profile may correspond to an HLS profile, or a streaming MPD may correspond to an HLS MPD.

In some aspects, the streaming profile may correspond to a set of constraints for mapping the structures associated with the first streaming format to the structures associated with the second streaming format.

In some aspects, the identifying of the structures associated with the first streaming format may be based on using a second streaming manifest that includes a second profile signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
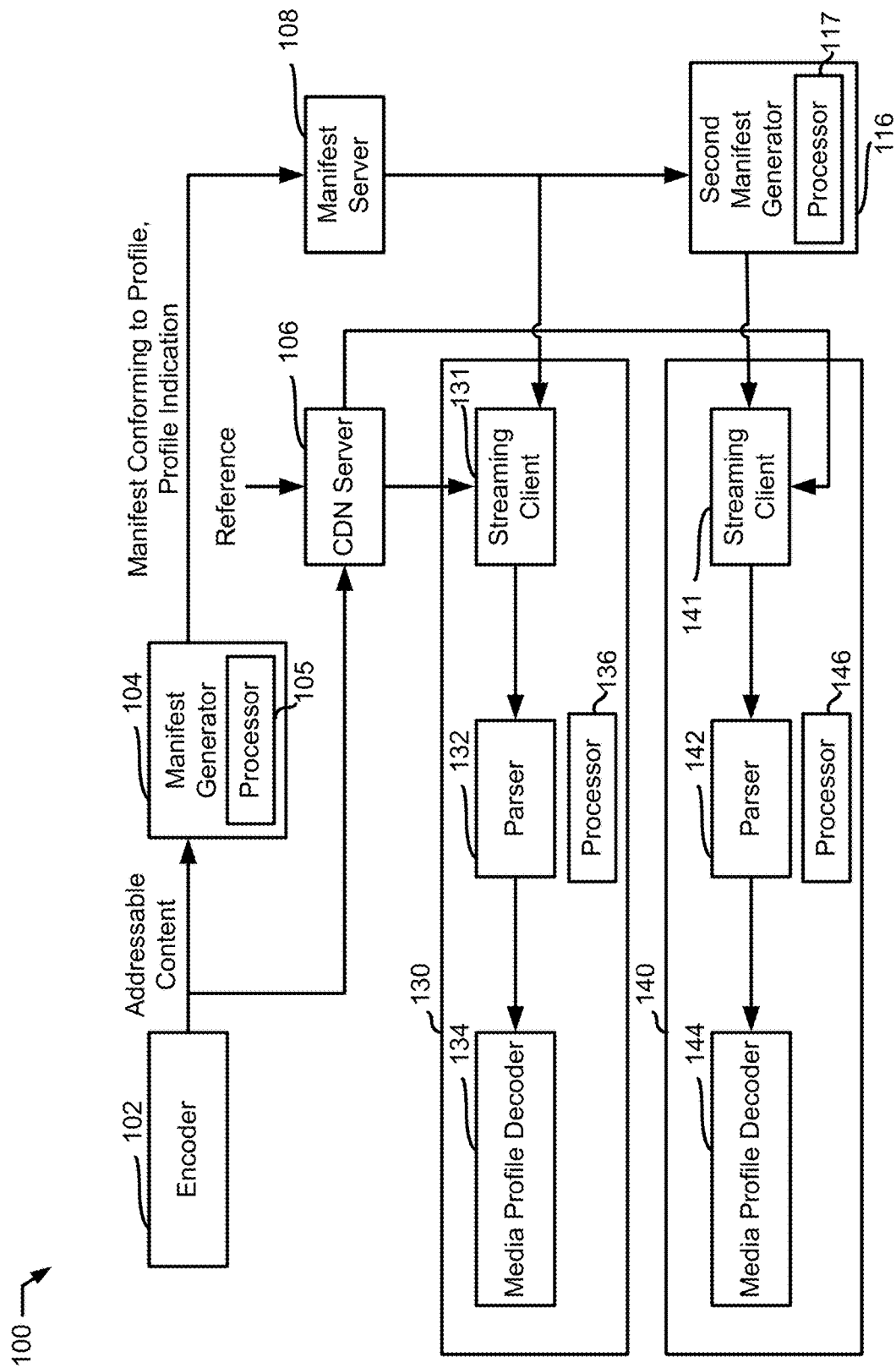
FIG. 1 is a block diagram that illustrates an example system in accordance with the techniques of this disclosure.

This disclosure describes techniques for generating a streaming manifest including or associated with a profile indication for streaming of content encoded based on a first streaming format such as an encapsulation format. Examples disclosed herein provide a profile that defines how the content encoded based on the first streaming format can be consistently mapped to structures of a second, different streaming format in a unique way so that constructs of the first streaming format are maintained in a manifest. The profile disclosed herein also provides a guarantee to media playback clients that the content included in the manifest follows a construct of the first streaming format (and how the first streaming format construct is defined) to enable proper playback, such as continuous playout, seamless switching of tracks in a switching set, etc., of the content based on the first streaming format construct. In some examples, the profile disclosed herein also enables the conversion of content encoded based on the first streaming format announced in a manifest into other streaming manifests without parsing the addressable resources.

The techniques described herein allow media to be encoded and stored a single time, but accessed by multiple streaming clients utilizing multiple different streaming formats, reducing resources for encoding and storing the media and reducing storage space.

The Common Media Application Format (CMAF) is used as an example of a first streaming format, and the Dynamic Adaptive Streaming over Hypertext Transfer Protocol (DASH) is used as an example of a second streaming format. However, these are just examples, and the present disclosure is not limited thereto.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like, which can be collectively referred to as "elements." These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors, which may also be referred to as processing units. Examples of processors include image signal processors (ISPs), central processing units (CPUs), graphics processing units (GPUs), image processors, video processors, microprocessors, microcontrollers, application processors, digital signal processors (DSPs), reduced instruction set computing (RISC) processors, systems on a chip (SoC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application (e.g., software) being configured to perform one or more functions. In such examples, the application may be stored on a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and executed the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can be a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium" and "computer-readable memory" are used interchangeably.

As used herein, a manifest (sometimes referred to as a media presentation description (MPD) is a file (e.g., an Extensible Markup Language (XML) document) that contains information about the content encoded based on the first streaming format. For example, a manifest may include information about media segments, their relationships, references to addressable resources, and/or other information to, for example, find the resources (e.g., on an HTTP server and/or in a cache) to facilitate playback of the content in real-time. As used herein, a profile is a set of constraints (sometimes referred to as "rules" or "constructs") that indicates that the content provided in the manifest is content that conforms to constructs encoded based on the first streaming format, including, among other constraints, Track constraints (e.g., CMAF track constraints), Switching Set constraints (e.g., CMAF Switching Set constraints), Selection Set constraints (e.g., CMAF Selection Set constraints), and Presentation constraints (e.g., CMAF Presentation constraints). A profile indication with the manifest or added to the manifest, for example, in a profiles parameter of a manifest, indicates that the streaming content, for example the Media Presentation, also conforms to the first streaming format and that the manifest is following the constraints included in the profile. As used herein, streaming of content encoded based on the first streaming format may refer to the distribution of the content and/or of the playback of content.

Although some of the following description may be focused on DASH structures (e.g., DASH profiles, DASH manifests, etc.), it should be appreciated that the concepts described herein may be applicable to other similar areas, such as HLS (HTTP Live Streaming) structures.

FIG. 1 is a block diagram that illustrates an example system 100 in accordance with the techniques of this disclosure. The example system 100 includes an encoder 102, a manifest generator 104, a content delivery network (CDN) server 106, an manifest server 108, a first device 130, and a second device 140. The first device 130 includes a streaming client 131, a parser 132, and a media profile decoder 134. The second device 140 includes a streaming client 141, a parser 142, and a media profile decoder 144.

In the illustrated example of FIG. 1, the encoder 102 takes data (e.g., media) and generates addressable content according to a first streaming format. The first streaming format may be an encapsulation format or a packaging format. The encoder 102 may be an average bitrate (ABR) encoder. The addressable content contains the data in packaged form, for example as separate files, to be stored for future playback by a device. For example, the first streaming format may be CMAF. The encoder 102 transmits the addressable content to a CDN server 106, and the CDN server 106 stores the addressable content. The encoder 102 also transmits the addressable content to the manifest generator 104.

The manifest generator 104 generates a manifest based on the addressable content and a second streaming format. For example, the second streaming format may be DASH, and the manifest may be a DASH MPD. The manifest generator 104 includes a profile. The profile includes information (e.g., rules and/or constraints) determining how structures according to the first streaming format should be mapped to structures according to the second streaming format, and the manifest is generated in accordance with the information of the profile. The manifest includes a mapping of the structures of the addressable content (e.g., the structures of the first streaming format) to structures of the second streaming format, in accordance with the profile. The mapping may be a data model or structuring of arbitrary files of the addressable content into a form that conforms to the streaming profile. For example, the manifest may be a file identifying specific structures (e.g., by an identifier or an addressable location of the structure) of the addressable content as corresponding to specific structures according to the second streaming format. The manifest generator 104 may transmit the manifest to the manifest server 108, and the manifest server 108 may store the manifest. The manifest generator 104 may also transmit a profile indication (e.g., a profile signal) to the manifest server 108. The profile indication may identify the profiles used to generate the manifest. The profile indication can be included as part of the manifest or may be transmitted along with the manifest. The manifest server 108 may store the profile indication as part of the manifest or in association with the manifest.

The manifest generator 104 may include a processor 105. The processor 105 may be a component of a server of a content delivery network. The processor 105 may execute software stored on a memory, which when executed by the processor 105 causes the processor 105 to perform the various functions of the manifest generator 104 described above.

The second manifest generator 116 may generate a second manifest based on the manifest generated by the manifest generator 104. The second manifest may be based on a third streaming format, different from the second streaming format used to generate the original manifest. The second manifest generator 116 may receive the manifest and the profile indication from the manifest server 108. The second manifest generator 116 may then determine the profile used to generate the manifest based on the profile indication, and determine the addressable content based on the manifest and the profile. The second manifest generator 116 may then generate a second manifest, mapping the structures of the addressable content to structures of the third streaming format, based on a second profile with different information (e.g., rules or constraints). The second manifest may be stored with a second profile indication identifying the second profile.

The second manifest generator 116 may include a processor 117. The processor 117 may be a component of a server of a content delivery network. The processor 117 may execute software stored on a memory, which when executed by the processor 117 causes the processor 117 to perform the various functions of the second manifest generator 116 described above.

The first device 130 and the second device 140 may be devices that playback streaming media, such as a computer, a phone, or a television. The first device 130 and the second device 140 may playback content using different streaming formats. For example, the first device 130 may be an android smartphone, and the second device 140 may be an iOS smartphone.

The first device 130 may playback the data (e.g., media) encoded by the encoder 102. The streaming client 131 may be a client for the second streaming format. The streaming client 131 may receive (e.g., retrieve) the manifest and the profile indication from the manifest server 108. The streaming client 131 may also receive (e.g., retrieve) the addressable content from the CDN server 106. The streaming client 131 may determine the profile used to generate the manifest based on the profile indication. The streaming client 131 may then stream portions of the addressable content, still encoded based on the first streaming format, using the second streaming format based on the manifest. The streaming client 131 may provide the streamed portions of addressable content to the parser 132. The parser 132 may decode the addressable content to retrieve the original data, and pass the data to the media profile decoder 134 for playback.

The first device 130 may include a processor 136. The processor 136 may execute software stored on a memory, which when executed by the processor 136 causes the processor 136 to perform the various functions of the streaming client 131, the parser 132, and the media profile decoder 134 described above.

The second device 140 may playback the data (e.g., media) encoded by the encoder 102. The streaming client 141 may be a client for the third streaming format. The streaming client 141 may receive (e.g., retrieve) the second manifest and the second profile indication from the second manifest generator 116 (e.g., through a second manifest server). The streaming client 141 may also receive (e.g., retrieve) the addressable content from the CDN server 106. The streaming client 141 may determine the second profile used to generate the second manifest based on the second profile indication. The streaming client 141 may then stream portions of the addressable content, still encoded based on the first streaming format, using the third streaming format based on the second manifest. The streaming client 141 may provide the streamed portions of addressable content to the parser 142. The parser 142 may decode the addressable content to retrieve the original data, and pass the data to the media profile decoder 144 for playback.

The second device 140 may include a processor 146. The processor 146 may execute software stored on a memory, which when executed by the processor 146 causes the processor 146 to perform the various functions of the streaming client 141, the parser 142, and the media profile decoder 144 described above.

In the illustrated example, the profile indication included with the manifest enables the system 100 to uniquely describe, maintain, and recover the constructs of the addressable content, still encoded based on the first streaming format. By doing so, the manifest can be used recover the addressable content, as well as to create other manifests without parsing the segments of the addressable content. As a result, the techniques disclosed herein can enable late (or downstream) conversion of the manifest (e.g., by the client(s) 131, 141) to another second streaming format.

Figure 2:
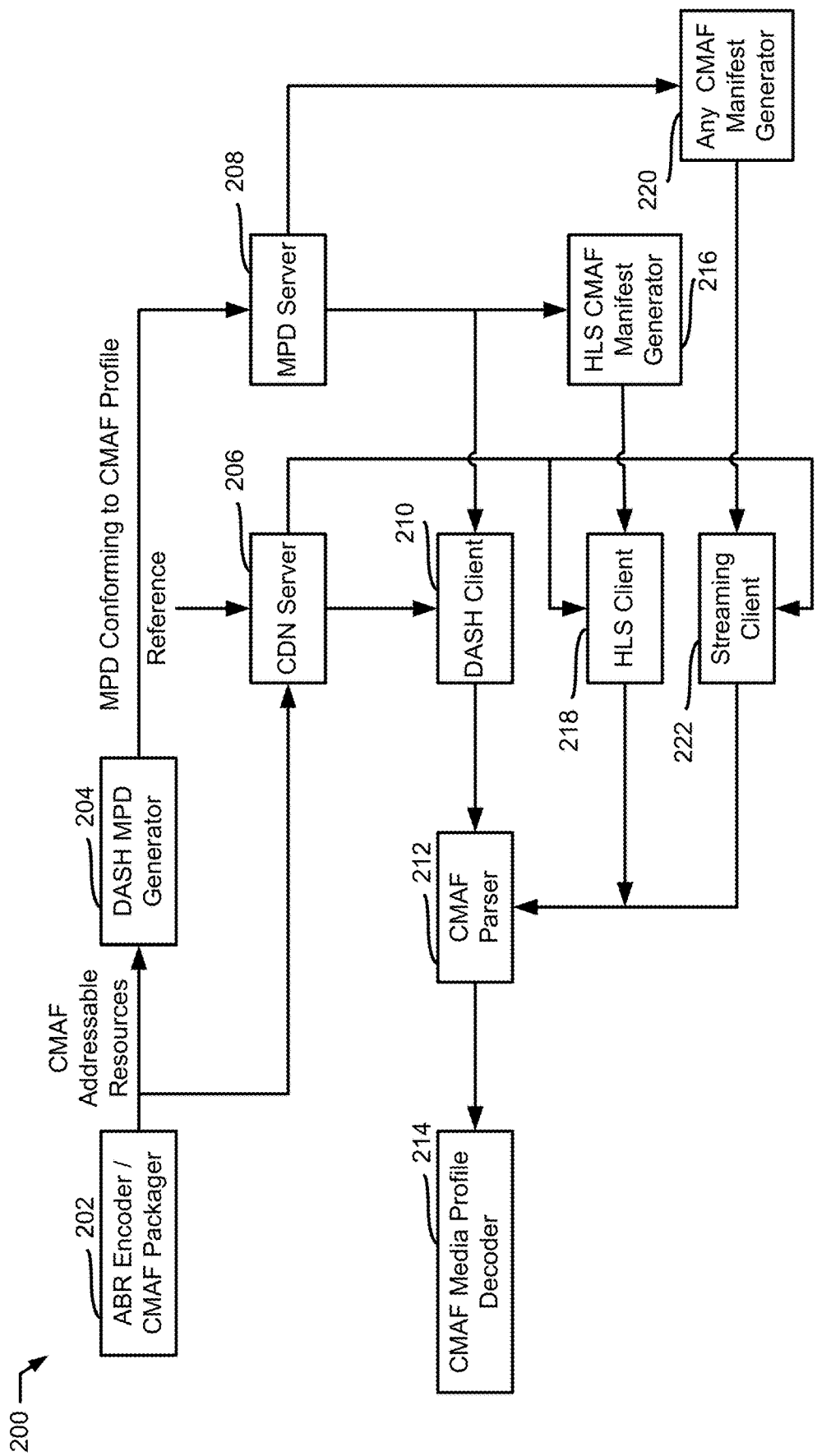
FIG. 2 is a block diagram that illustrates an example system using CMAF as a first streaming format and DASH as a streaming format in accordance with the techniques of this disclosure.

FIG. 2 is a block diagram that illustrates an example system 200 in accordance with the techniques of this disclosure using CMAF as a first streaming format and DASH as a second streaming format. The example system 200 includes an ABR encoder/CMAF packager 202, a DASH MPD generator 204, a CDN server 206, an MPD server 208, a DASH client 210, a CMAF parser 212, a CMAF media profile decoder 214, an HLS CMAF manifest generator 216, an HLS client 218, an any CMAF manifest generator 220, and a streaming client 222.

In the illustrated example of FIG. 2, the DASH MPD generator 204 generates a DASH MPD based on CMAF content (e.g., CMAF addressable resources provided by the ABR encoder/CMAF packager 202). The example DASH MPD generator 204 creates a manifest based on the CMAF content. The manifest (e.g., a DASH manifest) maps the CMAF content to DASH structures. The DASH MPD generator 204 also includes a profile (e.g., a DASH profile) in the manifest and a profile signal. The profile includes a set of rules used to map the CMAF content to the DASH structures. The profile also includes a profile signal indicating (or guaranteeing) that the CMAF content associated with the DASH MPD was mapped to the DASH structures based on the set of rules (or constraints) identified by the profile. Thus, the DASH MPD generator 204 outputs a DASH MPD that consistently maps the corresponding CMAF content to DASH structures in such a way that any CMAF constructs are maintained in the DASH MPD.

For example, the DASH MPD generator 204 may identify structures associated with first media (e.g., the CMAF content). In some examples, the CMAF content is associated with a first streaming format (e.g., the CMAF format). The example DASH MPD generator 204 may then generate a streaming manifest (e.g., a DASH manifest) for the CMAF content. In some examples, the DASH manifest maps the structures associated with the CMAF content to structures associated with the DASH format. In some examples, the mapping of the structures associated with the CMAF content to the structures associated with the DASH format is based on a streaming profile (e.g., a DASH profile). The example DASH MPD generator 204 may also include a profile signal in the DASH manifest, wherein the profile signal identifies the streaming profile (e.g., the DASH profile) used to map the structures associated with the CMAF content to the structures associated with the DASH format. The example DASH MPD generator 204 may also generate a streaming MPD (e.g., a DASH MPD) based on the DASH manifest and including addressable resources associated with the CMAF content.

The DASH MPD may then be provided to the CDN server 206 and/or the MPD server 208. The CDN server 206 and/or the MPD server 208 may enable serving the CMAF content to a viewer. As in illustrative example, the MPD server 208 serves the DASH MPD to the DASH client 210. The DASH client 210 accesses the DASH MPD and attempts playback of the corresponding content. In the illustrated example, as the DASH MPD includes the profile and the profile signal provided by the DASH MPD generator 204, the DASH client 210 is able to determine what constitutes the CMAF construct of the DASH MPD to enable proper playback of the of CMAF content associated with the DASH MPD. For example, the DASH client 210 may use the rules of the profile to map the DASH structures to the CMAF content. The DASH client 210 may then provide the CMAF content to the CMAF parser 212 and the CMAF media profile decoder 214 to enable proper playback of the CMAF content.

While the above example generates a DASH manifest and profile to map the CMAF content to DASH structures, in other examples, the system 200 may facilitate mapping the CMAF content to additional or alternative streaming formats. For example, in some examples, the DASH MPD generator may be an HLS MPD generator and/or another streaming MPD generator.

In some examples, once the CMAF content has been mapped to the DASH structures, the system 200 may enable converting the DASH MPD to another streaming format. For example, in the illustrated example of FIG. 2, the system 200 includes the HLS CMAF manifest generator 216 and the any CMAF manifest generator 220. In the illustrated example, the HLS CMAF manifest generator 216 generates an HLS manifest that facilitates converting the DASH MPD to an HLS MPD without accessing the CMAF content referenced by the DASH MPD. For example, the HLS CMAF manifest generator 216 may create an HLS manifest including an HLS profile that maps the DASH structures of the DASH MPD to HLS structures defined by the HLS profile.

Additionally or alternatively, the any CMAF manifest generator 220 may generate a manifest based on another streaming format that facilitates converting the DASH MPD to another streaming format MPD without accessing the CMAF content referenced by the DASH MPD. For example, the any CMAF manifest generator 220 may create another streaming format manifest including another streaming profile that maps the DASH structures of the DASH MPD to structures associated with the other streaming format and defined by the streaming profile.

The respective MPDs output by the HLS CMAF manifest generator 216 and/or the any CMAF manifest generator 220 may then be served to the respective media playback client (e.g., the HLS client 218 and/or the streaming client 222). The respective media playback client then maps the respective structures of the corresponding MPDs to the CMAF content, which is then provided to the CMAF parser 212 and the CMAF media profile decoder 214 to enable proper playback of the CMAF content.

In the illustrated example, the profile signal included in the DASH MPD may enable the system 200 to uniquely describe, maintain, and recover the CMAF constructs. By doing so, the DASH MPD can be used recover CMAF, as well as to create other manifests without parsing the segments of the CMAF content. As a result, the techniques disclosed herein may enable late (or downstream) conversion of the DASH MPD (e.g., by the client(s) 210, 218, 222) to another streaming format (e.g., to an HLS MPD, etc.).

By including the profile and profile signal in the DASH MPD, techniques disclosed herein may enable content to be generated once (e.g., by the DASH MPD generator 204) and then may enable downstream systems accessing the system 200 to convert the DASH MPD to another streaming format, such as HTTP live streaming (HLS). Thus, for example, a proxy of an edge cache and/or an end device that includes a streaming client (e.g., the DASH client 210, the HLS client 218, and/or the streaming client 222).

In some aspects, other streaming formats may additionally or alternatively be used for mapping the CMAF content to the respective structures. In certain such examples, providing the profile signal in the corresponding profile enables easy conversation of the streaming content at the manifest level.

CMAF Content Model

In this section, a CMAF content model will be described as an example of a content model for a first streaming format.

Figure 3:
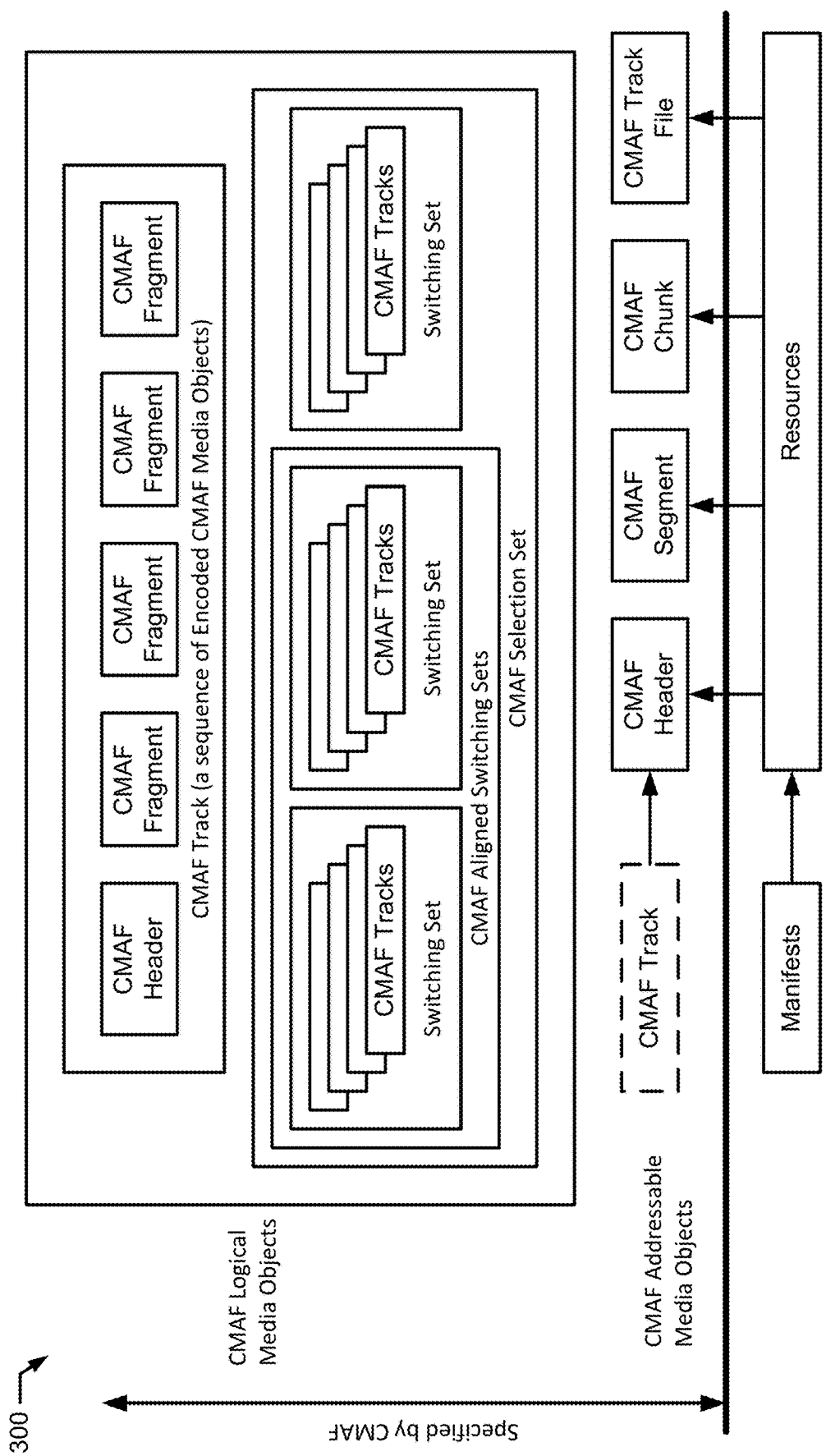
FIG. 3 illustrates an example CMAF content model.

FIG. 3 illustrates an example content model 300 for a first streaming format. The example content model 300 can be for CMAF. In the illustrated example, the CMAF content model 300 may provide the content model that is assumed to be conveyed from the CMAF packager 202 to the DASH MPD generator 204 of FIG. 2. The example CMAF content model 300 may be built on terminology defined in ISO/IEC 23000-19, and may also follow ISO/IEC 23000-19.

The example CMAF content model 300 includes, among other elements, CMAF Presentation(s), CMAF Selection Set(s), CMAF Switching Set(s), CMAF Track(s), CMAF Header(s), CMAF Chunk(s), CMAF Fragment(s), CMAF Segment(s), decode times of samples, and presentation times of samples.

As used herein, a media sample is media data in a CMAF track associated with a single decode start time and duration.

CMAF Addressable objects include CMAF Track Structure(s), CMAF Chunk Structure(s), CMAF Fragment Structure(s), and CMAF Segment Structure(s). In general, CMAF Fragments and CMAF Chunks may be embedded in Segments. Furthermore, in DASH structures, Segments are the addressable time (e.g., units with an assigned URL).

The CMAF presentation timing model includes one or more timelines associated with the authoring, playout, and/or rendering of CMAF tracks within a presentation. In some examples, each CMAF track may be a sequence of timed samples. Each sample may include a decode time and may also have a composition (display) time offset. Edit lists may be used to over-ride the implicit direct mapping of the media timeline, into the timeline of the overall movie. The movie timeline may be used to synchronize CMAF Tracks in a CMAF presentation, and may also serve as the synchronization source for playback in an HTML 5 media element and the media source.

In some examples, each CMAF Track may have assigned an anchor wall-clock time (e.g., a Coordinated Universal Time (UTC) time). The wall clock time may be used to relate the relative presentation time of the track to a wall-clock time, for example, by expressing the time when the corresponding sample was captured, encoded, and/or packaged.

Thus, as described above, the CMAF presentation timing model may include three timelines (e.g., the decode time, the presentation time, and the wall-clock time), and each of the respective timelines may be signaled.

In the illustrated example, the decode time of each CMAF chunk may be provided as the "baseMediaDecodeTime" in a "TrackFragmentBaseMediaDecodeTimeBox" parameter. The "baseMediaDecodeTime" provides the decode time of the first sample in the CMAF chunk and the remaining decode times are derived by the sample durations in a 'traf' box.

In the illustrated example, the presentation time of each CMAF sample in a CMAF fragment may be determined by the decode time of the sample and, if present, the composition offset (in the sample table) and/or the track edit list (in the track header). The earliest presentation time in a CMAF Fragment may be used for facilitating synchronization and/or switching. It should be appreciated that in some examples, the earliest presentation time of a CMAF Fragment may not be the presentation time of the first sample of the CMAF Fragment.

In the illustrated example, the wall-clock time may be mapped from a specific decode time via a "ProducerReferenceTimeBox" ('prtf') parameter.

In the illustrated example, each CMAF Track k (k=1, . . . , K) in a CMAF Switching Set may be defined via a CMAF Header (e.g., CH[k], k=1, . . . , K) and CMAF Fragments (e.g., CF[k,i], i=1, 2, 3, . . . , N). The CMAF Fragments may include a position in the CMAF Track (i), an earliest presentation time (tf[k,i]), a CMAF Fragment Duration (e.g., df[k,i]=tf[k,i+1]−tf[k,i]), a wall-clock time assigned to the earliest presentation time of CMAF Fragment (e.g., twc[k,i]), and/or CMAF Chunks (e.g., CC[k,i,j], j=1, 2, 3, . . . , C[i]). The CMAF Chunks may be include a position in the fragment (j), an earliest decode time (e.g., tc[k,i,j]), and/or a Chunk duration in decode times (e.g., dc[k,i,j]).

In some examples, the CMAF Track may include an edit list EL[k] that may be present in the CMAF header describing the difference between the composition time and the presentation for this track in the CMAF Presentation.

In some examples, the CMAF Track may include the earliest presentation time of the first fragment (e.g., the presentation time offset (tf[k,i=1]).

In some examples, the duration of the CMAF Track may be defined as td[k].

In some examples, the CMAF Track may be assigned a media profile including, for example, a CMAF media profile brand. The media profile may additionally or alternatively include a suitable Multipurpose Internet Mail Extension (MIME) type string providing, for example, a media type, codecs parameter(s), and/or profiles.

In some example, the CMAF Track may include samples (sample[k,s]) with s=1, . . . , S, each with nominal presentation time T[k,s].

In the illustrated example, the CMAF Switching Set may be defined based on, for example, a set of CMAF Tracks conforming to the conditions for defining a CMAF Track. In some examples, the CMAF Switching Set may contain a single CMAF Header for all CMAF Tracks or an individual CMAF Header for each CMAF Track. In some examples, the CMAF Switching Set may include a Master CMAF Header CH*, which may be either the single header or a Master CMAF Header assigned to the Switching Set (CH*).

Based on the definition of the CMAF Switching Set, it should be appreciated that, in some examples, all CMAF Tracks in a Switching Set may conform to one media profile.

In some examples, there may exist one CMAF Header that may be used to initialize the playback of the Switching Set. This header can be referred to as Master CMAF Header (CH*).

In some examples, the CMAF Header for each track in a Switching Set may be defined such that appending it to the source buffer does not result in a re-initialization of the decoding and rendering platform.

In some examples, each CMAF Track in a Switching Set may have the same number of CMAF Fragments.

In some examples, the earliest decoding time of each CMAF Fragment at the same position (i) in different CMAF Tracks of a CMAF Switching Set may be identical.

In some examples, the earliest presentation time of each CMAF Fragment at the same position (i) in different CMAF Tracks of a CMAF Switching Set may be identical.

In some examples, the fragment duration of each CMAF Fragment at the same position in different CMAF Tracks or a CMAF Switching Set may be identical.

While the above definitions may apply to CMAF Fragments, they may not apply to CMAF Chunks.

DASH Profile for CMAF Content

In this section, a mapping of CMAF content such as the CMAF content model 300 described above onto DASH structures will be described as an example of mapping structures of a first streaming format to structures of a second streaming format, and to illustrate the content of a profile.

As described above in connection with FIG. 2, CMAF content may be generated independent of the manifest format and may be define structural relationship of CMAF tracks. In order to distribute CMAF content in DASH, the example DASH profile disclosed herein defines a normative mapping of CMAF structures to DASH structures. By this mapping, the content may conform to any CMAF constraints, as well as any DASH constraints.

In the illustrated example, the DASH Profile is identified by the uniform resource name (URN) "urn:mpeg:dash:profile:cmaf:2019." The profiles parameter may be present on different levels in the MPD. However, other techniques for identifying the DASH Profile in the manifest may additionally or alternatively be used, or that the DASH profile may be included with the manifest but not within the manifest.

The disclosed mapping is not merely mapping CMAF content to DASH, but it is a mapping that enables distribution of CMAF generated content in DASH.

If the example DASH Profile applies to a Representation, then it should be appreciated that for the Representation, each Media Segment of the Representation may conform to a CMAF Addressable Media Object (e.g., as defined in ISO/IEC 23000-19, clause 7.3.3).

For the Representation, in some examples, each Initialization Segment, if present, may conform to a CMAF Header (e.g., as defined in ISO/IEC 23000-19, clause 7.3.2.1). In some examples, the Representation may conform to a CMAF Track (e.g., as defined in ISO/IEC 23000-19, clause 7.3.2.2). In some examples, if the "@startsWithSAP" parameter is present and has value of 1 or 2, then every DASH Segment may conform to a CMAF Fragment. In some examples, the "@timecale" parameter may be set to the timescale of the CMAF track. In some examples, if the SegmentTimeline element is present for this Representation, then, for every CMAF Fragment (i), with i=1, 2, 3, . . . , N, an entry in an S element may be present, where the "@t" parameter may be set to the earliest presentation time (tf[k,i]), and the "@d" parameter may be set to CMAF Fragment duration (df[k,i]). Furthermore, if chunk mode is used, then the "@k" parameter may be set to the number of chunks in this CMAF Fragment (C[k,i]), and/or a compact representation of the Segment Timeline may be applied. In some examples, if the "@duration" attribute is present for this Representation and the value of the attribute is referred to as "dur," then, for each CMAF Fragment (i), with i=1, 2, 3, . . . , N, (((i−1)+0.5)*dur<=tf[k,i]<=(i+0.5)*dur). In some examples, if the media is contained in a Self-Initializing Segment, then (1) the Segment Index may be present, and/or (2) each CMAF Fragment may be mapped to a Subsegment.

In the illustrated example, if the example DASH profile applies to an Adaptation Set, then it should be appreciated that for the Adaptation Set, the "@contentType" parameter may be set to the "hdlr" type of the CMAF Master Header of the Switching Set (e.g., vide->video, soun->audio, subt->text, etc.). In some examples, the "@mimeType" parameter may be set to "<contentType>/mp4 profiles='cmfc.'" In some examples, the "@segmentProfiles" parameter may be set so that (1) with respect to File Mode, the segment profiles are not set, (2) with respect to Fragment Mode, "cmfs" and "cmff" apply, and (3) with respect to Chunk Mode, "cmfs," "cmff", and "cmfl" apply. For the Adaptation Set, in some examples, the "@codecs" parameter may be set to the sample entry of the CMAF Master Header. In some examples, if the Content is protected, then the "ContentProtection" element may be present and may be set appropriately. In some examples, if the "@contentType" parameter is video, then (1) the "@maxWidth" parameter may be set to the width in the CMAF TrackHeaderBox parameter of the CMAF Master Header, (2) the "@maxHeight" parameter may be set to the height in the CMAF TrackHeaderBox of the CMAF Master Header, and/or (3) the "@maxFrameRate" parameter may be set to the framerate of the CMAF TrackHeaderBox of the CMAF Master Header. In some examples, if the "@contentType" parameter is audio, then certain of the parameters may be set accordingly. In some examples, each CMAF Track (k=1, . . . . K) in the Switching Set may be mapped to exactly one Representation (e.g., as defined above in connection with the Switching Set definitions). In some examples, if the "@bitstreamSwitching" parameter is set to true, then the included CMAF Switching Set may follow the "CMAF switching set single initialization constraints" of clause 7.3.4.2 in ISO/IEC 23000-19. In some examples, either the "@segmentAlignment" parameter or the "@subsegmentAlignment" parameter may be set.

In the illustrated example, if the example DASH profile applies to a Period, then it should be appreciated that for the Period, all Adaptation Sets set to the same integer value for the "@segmentAlignment" parameter or the "@subsegmentAlignment" parameter may conform to aligned CMAF Switching Set constraints (e.g., as defined in clause 7.3.4.4 in ISO/IEC 23000-19). In some examples, each Switching Set in the CMAF Presentation may be mapped exactly to the Adaptation Set in the Period (e.g., as defined above in connection with the Adaption Set definitions). In some examples, each Selection Set may be mapped to exactly one Group (e.g., as defined above in connection with the Selection Set definitions). In some examples, a Group may conform to a Selection Set. In some examples, the value of the "@presentationTimeOffset" parameter in DASH may be identical to the CMAF presentation time zero. In some examples, the duration of a Period may be, at most, the duration of the contained CMAF presentation.

In the illustrated example, if the example DASH Profile applies to a Media Presentation, then it should be appreciated that each Period in the DASH MPD may conform to the Period definitions defined above.

In view of the above, if the DASH MPD conforms to the above-described CMAF media profile, then the DASH MPD may be checked against any format constraints for the defined DASH profile. In addition, in some examples, the DASH MPD may also be checked against any CMAF conformance using, for example, the mappings described above. In some examples, if the DASH MPD is properly mapped (e.g., authored), then the DASH MPD may conform to any DASH content constraints and to any CMAF constraints.

Table 1 below illustrates an example DASH profile that may be used by, for example, the DASH MPD generator 204 of FIG. 2 to generate the DASH MPD.

TABLE 1

```
<?xml version="1.0"?>
<MPD
    xmlns:xsi="http://www.w3.org/2001/XMLSchema-instance"
    xmlns="urn:mpeg:dash:schema:mpd:2011"
    xsi:schemaLocation="urn:mpeg:dash:schema:mpd:2011
    DASH-MPD.xsd"
    type="static"
    mediaPresentationDuration="PT24S"
    availabilityStartTime="2014-10-17T17:17:05Z"
    minBufferTime="PT4S"
    profiles="urn:mpeg:dash:profile:cmaf:2019,urn:mpeg:dash:profile:isoff-live:2011"
    <Period id="1">
        <!-- Video -->
        <AdaptationSet
            contentType="video"
            id="1"
            mimeType="video/mp4 profiles='cmfc'"
            codecs="avc1.4D401F"
            maxWidth="1080"
            maxHeight="720"
            maxFrameRate="30"
            segmentProfiles="cmfs,cmff"
            segmentAlignment="true"
            startWithSAP="1">
            <SegmentTemplate timescale="30"
            initialization="$RepresentationID$/0"
media="$RepresentationID$/$Number$">
                <SegmentTimeline>
                    <S t="0" d="120" r="5"/>
                </SegmentTimeline>
            </SegmentTemplate>
            <Representation id="video1/1" bandwidth="250000"/>
            <Representation id="video1/2" bandwidth="500000"/>
            <Representation id="video1/3" bandwidth="1000000"/>
        </AdaptationSet>
        <!-- Audio -->
        <AdaptationSet
            contentType="audio"
            id="1"
            mimeType="audio/mp4 profiles='cmfc'"
            codecs="haac"
            segmentProfiles="cmfs,cmff"
            segmentAlignment="true"
            startWithSAP="1">
            <SegmentTemplate timescale="48"
            initialization="$RepresentationID$/0"
media="$RepresentationID$/$Number$">
                <SegmentTimeline>
                    <S t="0" d="120" r="5"/>
                </SegmentTimeline>
            </SegmentTemplate>
            <Representation id="audio1/1" bandwidth="2500"/>
            <Representation id="audio1/2" bandwidth="500000"/>
        </AdaptationSet>
    </Period>
</MPD>
```

Figure 4:
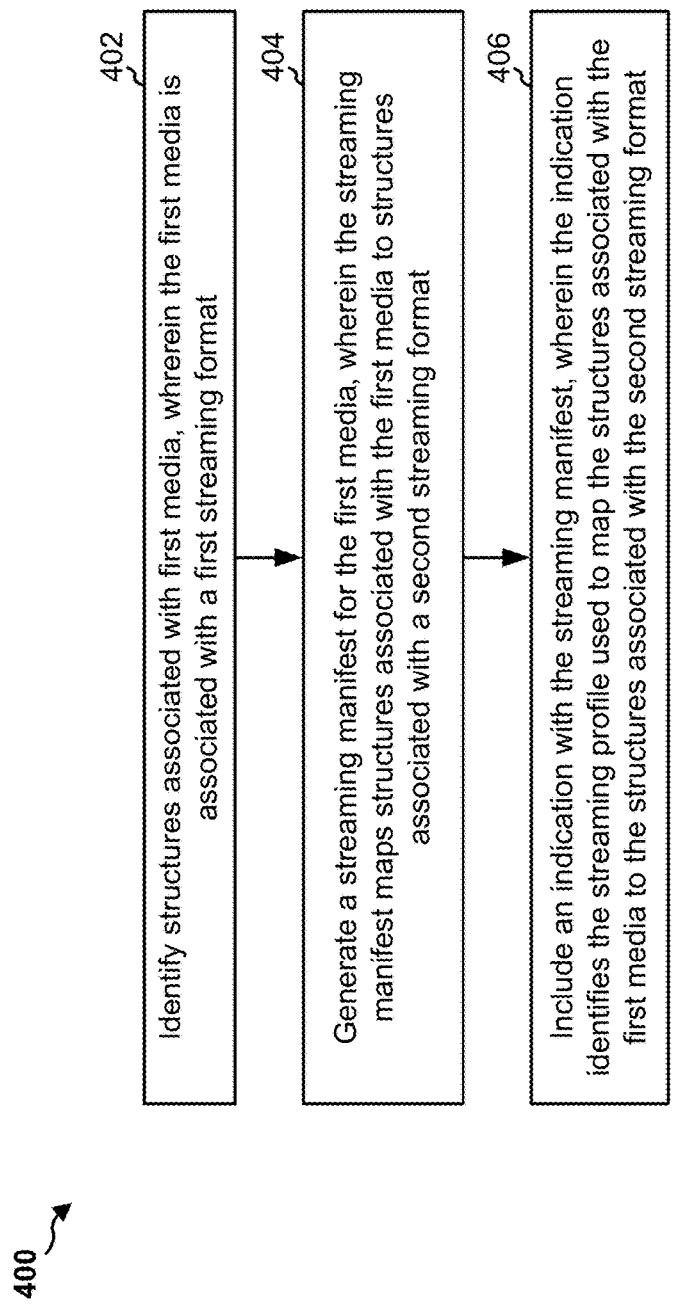
FIG. 4 illustrates an example flowchart of an example method in accordance with techniques of this disclosure.

FIG. 4 illustrates an example flowchart 400 of an example method in accordance with one or more techniques of this disclosure. The method may be performed by an apparatus, such as the manifest generator 104, the second manifest generator 116, the DASH MPD generator 204, the HLS CMAF manifest generator 216, and/or the any CMAF manifest generator 220.

At 402, the manifest generator identifies structures associated with first media (e.g., CMAF content). The first media is associated with a first streaming format. The first streaming format may be at least one of an encapsulation format, a packaging format, or a CMAF. For example, referring to the example system 100 of FIG. 1, the manifest generator 104 may identify one or more structures of the first streaming format based on the addressable content provided by the encoder 102.

At 404, the manifest generator generates a streaming manifest (e.g., a DASH manifest) for the first media. The streaming manifest maps structures associated with the first media to structures associated with a second streaming format (e.g., the DASH format). The mapping of the structures associated with the first media to the structures associated with the second streaming format may be based on a set of information included in a streaming profile (e.g., a DASH profile). The set of information may be a set of rules. The streaming manifest may be used to create a media presentation, and segments of the media presentation may conform to the second streaming format. In some aspects, the streaming manifest may correspond to a DASH MPD, the streaming profile may correspond to a DASH profile, or a streaming MPD may correspond to a DASH MPD. In some aspects, the streaming manifest may correspond to an HLS manifest, the streaming profile may correspond to an HLS profile, or a streaming MPD may correspond to an HLS MPD. The streaming profile may correspond to a set of constraints for mapping the structures associated with the first media to the structures associated with the second streaming format.

The identifying of the structures associated with the first media may be based on using a second streaming manifest that includes a second profile signal. The second streaming manifest may correspond to a third streaming format different from the second streaming format.

At 406, the manifest generator includes an indication with the streaming manifest. The indication identifies the streaming profile used to map the structures associated with the first media to the structures associated with the second streaming format. The indication may be a profile signal. The indication may be in the streaming manifest.

Figure 5:
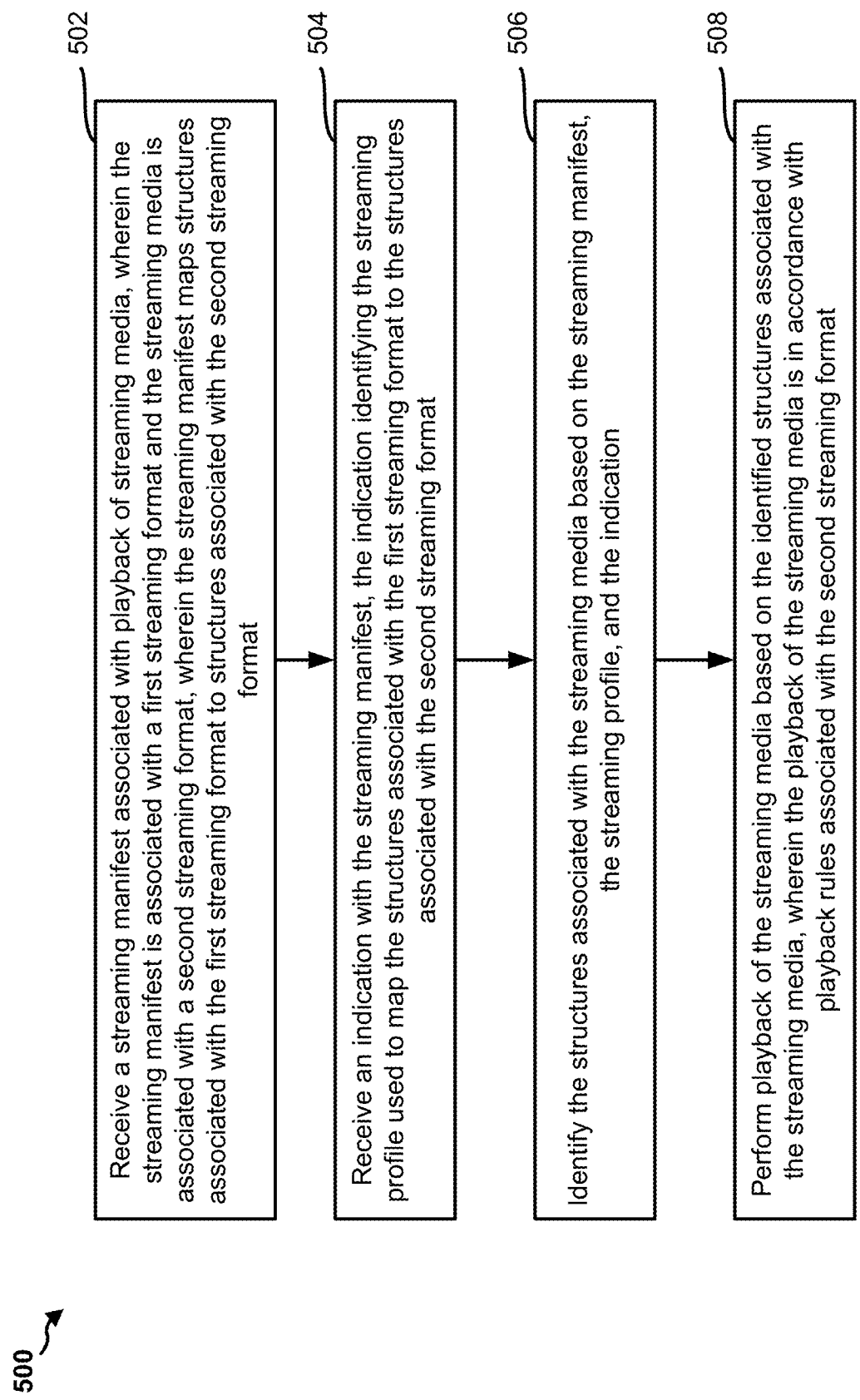
FIG. 5 illustrates an example flowchart of another example method in accordance with techniques of this disclosure.

FIG. 5 illustrates an example flowchart 500 of an example method in accordance with one or more techniques of this disclosure. The method may be performed by an apparatus, such as the streaming client 131, the streaming client 141, the DASH client 210, the HLS client 218, and/or the streaming client 222 of FIG. 2.

At 502, the client receives a streaming manifest (e.g., a DASH manifest) associated with playback of streaming media (e.g., CMAF content). For example, referring to the example system 100 of FIG. 1, the streaming client 131 may receive the streaming manifest from the manifest server 108, or the streaming client 141 may receive the streaming manifest from the second manifest generator 116. The streaming manifest is associated with a first streaming format (e.g., CMAF) and the streaming media is associated with a second streaming format (e.g., DASH). The streaming manifest maps structures associated with the first streaming format to structures associated with the second streaming format. The first streaming format may be at least one of an encapsulation format, a packaging format, or a CMAF.

At 504, the client receives an indication with the streaming manifest. The indication identifies the streaming profile (e.g., a DASH profile) used to map the structures associated with the first streaming format to the structures associated with the second streaming format. The mapping of the structures associated with the first streaming format to the structures associated with the second streaming format may be based on a set of information included in a streaming profile. The set of information may be a set of rules. The indication may be a profile signal. The indication may be in the streaming manifest. In some aspects, the streaming manifest may correspond to a DASH MPD, the streaming profile may correspond to a DASH profile, or a streaming MPD may correspond to a DASH MPD. In some aspects, the streaming manifest may correspond to an HLS manifest, the streaming profile may correspond to an HLS profile, or a streaming MPD may correspond to an HLS MPD. The streaming profile may correspond to a set of constraints for mapping the structures associated with the first media to the structures associated with the second streaming format.

At 506, the client identifies the structures associated with the streaming media based on the streaming manifest, the streaming profile, and the indication.

At 508, the client performs playback of the streaming media based on the identified structures associated with the streaming media. The playback of the streaming media is in accordance with playback rules associated with the second streaming format.

In some aspects, the identifying of the structures associated with the first media may be based on using a second streaming manifest that includes a second profile signal.

The specific order or hierarchy of blocks in the processes/flowcharts disclosed is an illustration of example approaches. Based upon the type of design, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

In some aspects, a system according to the present disclosure, such as the example system 100, includes means for identifying structures associated with first media, means for generating a streaming manifest for the first media, and means for including an indication with the streaming manifest. For example, in the example system 100 of FIG. 1, the manifest generator 104 or the second manifest generator 116 may be the means for identifying structures associated with first media, means for generating a streaming manifest for the first media, and means for including an indication with the streaming manifest. Specifically, the processor 105 of the manifest generator 104 or the processor 117 of the second manifest generator 116 may be the means for identifying structures associated with first media, means for generating a streaming manifest for the first media, and means for including an indication with the streaming manifest.

In some aspects, a system according to the present disclosure, such as the example system 100, includes means for receiving a streaming manifest associated with playback of streaming media, means for receiving an indication with the streaming manifest, means for identifying the structures associated with the streaming media based on the streaming manifest, the streaming profile, and the indication, and means for performing playback of the streaming media based on the identified structures associated with the streaming media. For example, in the example system 100 of FIG. 1, the streaming client 131 or the streaming client 141 may be the means for receiving a streaming manifest associated with playback of streaming media, means for receiving an indication with the streaming manifest, means for identifying the structures associated with the streaming media based on the streaming manifest, the streaming profile, and the indication, and means for performing playback of the streaming media based on the identified structures associated with the streaming media. Specifically, the processor 136 of the first device 130 or the processor 146 of the second device 140 may be the means for receiving a streaming manifest associated with playback of streaming media, means for receiving an indication with the streaming manifest, means for identifying the structures associated with the streaming media based on the streaming manifest, the streaming profile, and the indication, and means for performing playback of the streaming media based on the identified structures associated with the streaming media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of data processing, comprising:
receiving a bitstream comprising addressable content generated according to a first streaming format, the addressable content comprising first structures associated with a first media, wherein the first media is maintained in the first streaming format without storing the first media in a second streaming format different from the first streaming format and the addressable content is associated with the first media;
generating a first streaming manifest that maps the first structures to second structures associated with the second streaming format in accordance with a streaming profile associated with the second streaming format; and
sending, to a client, a profile signal identifying the streaming profile for enabling the client, by using the streaming profile identified by the profile signal to stream the first media, while generated in the first streaming format, in the second streaming format instead of the first streaming format.

2. The method of claim 1, wherein the streaming profile comprises a set of constraints associated with the first streaming format.

3. The method of claim 1, wherein the first streaming manifest is used to create a media presentation, and wherein segments of the media presentation conform to the second streaming format.

4. The method of claim 1, wherein the profile signal identifying the streaming profile is included in the first streaming manifest.

5. The method of claim 1, wherein the first streaming format comprises at least one of an encapsulation format, a packaging format, or a common media application format (CMAF).

6. The method of claim 1, wherein the first streaming manifest corresponds to a Dynamic Adaptive Streaming over HTTP (DASH) media presentation description (MPD) and the streaming profile corresponds to a DASH profile.

7. The method of claim 1, wherein the first streaming manifest corresponds to an HTTP Live Streaming (HLS) manifest and the streaming profile corresponds to an HLS profile.

8. The method of claim 1, wherein the first streaming manifest is a file identifying the first structures as corresponding to the second structures.

9. The method of claim 8, wherein the file identifies the first structures as corresponding to the second structures by an identifier or addressable location.

10. The method of claim 1, further comprising generating a streaming media presentation description (MPD) based on the first streaming manifest.

11. The method of claim 10, wherein the streaming MPD corresponds to an HTTP Live Streaming (HLS) MPD.

12. The method of claim 1, wherein the streaming profile includes a profile signal guaranteeing that the addressable content in the first streaming format is mapped to the second structures based on a mapping between the first media and the second structures conforming to a set of rules of the first streaming format.

13. An apparatus for data processing, comprising:
a memory; and
at least one processor coupled to the memory and configured to:
receive a bitstream comprising addressable content generated according to a first streaming format, the addressable content comprising first structures associated with a first media, wherein the first media is maintained in the first streaming format without storing the first media in a second streaming format different from the first streaming format and the addressable content is associated with the first media;
generate a first streaming manifest that maps the first structures to second structures associated with the second streaming format in accordance with a streaming profile associated with the second streaming format; and
send, to a client, a profile signal identifying the streaming profile for enabling the client, by using the streaming profile identified by the profile signal to stream the first media, while encoded in the first streaming format, in the second streaming format instead of the first streaming format.

14. The apparatus of claim 13, wherein the streaming profile comprises a set of constraints associated with the first streaming format.

15. The apparatus of claim 13, wherein the first streaming manifest is used to create a media presentation and wherein segments of the media presentation conform to the second streaming format.

16. The apparatus of claim 13, wherein the profile signal identifying the streaming profile is included in the first streaming manifest.

17. The apparatus of claim 13, wherein the first streaming format comprises at least one of an encapsulation format, a packaging format, or a common media application format (CMAF).

18. The apparatus of claim 13, wherein the first streaming manifest corresponds to a Dynamic Adaptive Streaming over HTTP (DASH) media presentation description (MPD) and the streaming profile corresponds to a DASH profile.

19. The apparatus of claim 13, wherein the first streaming manifest corresponds to an HTTP Live Streaming (HLS) manifest and the streaming profile corresponds to an HLS profile.

20. The apparatus of claim 13, wherein the first streaming manifest is a file that identifies the first structures as corresponding to the second structures.

21. The apparatus of claim 20, wherein the file identifies the first structures as corresponding to the second structures by an identifier or addressable location.

22. The apparatus of claim 13, wherein the at least one processor is further configured to generate a streaming media presentation description (MPD) based on the first streaming manifest.

23. The apparatus of claim 22, wherein the streaming MPD corresponds to an HTTP Live Streaming (HLS) MPD.

24. The apparatus of claim 13, wherein the streaming profile includes a profile signal guaranteeing that the addressable content in the first streaming format is mapped to the second structures based on a mapping between the first media and the second structures conforming to a set of rules of the first streaming format.

25. A method of data processing, comprising:
receiving, from a server and at a client, a bitstream associated with streaming media, wherein the bitstream comprises a first streaming manifest associated with a first streaming format, wherein the streaming media is associated with a second streaming format different from the first streaming format, the first streaming manifest maps first structures associated with the first streaming format to second structures associated with the second streaming format, the first streaming manifest is generated based on addressable content generated in accordance with the first streaming format, and the addressable content is generated based on the streaming media;
receiving, from the server and at the client, a profile signal identifying a streaming profile, wherein the profile signal indicates the addressable content in the first streaming format is mapped to the second structures based on:
a mapping between the streaming media associated with the first streaming format, and
the second structures conforming to a set of constraints of the first streaming format;
identifying structures associated with the streaming media based on the first streaming manifest and the streaming profile; and
performing playback of the streaming media, generated according to the first streaming format, in the second streaming format instead of the first streaming format using the streaming profile, wherein the playback of the streaming media is in accordance with playback rules associated with the second streaming format.

26. The method of claim 25, wherein the first structures are mapped to the second structures further based on a set of information included in the streaming profile.

27. The method of claim 26, wherein the set of information includes the set of constraints.

28. The method of claim 25, wherein the profile signal is included in the first streaming manifest.

29. The method of claim 25, wherein the first streaming format is at least one of an encapsulation format, a packaging format, or a common media application format (CMAF).

30. The method of claim 25, wherein the first streaming manifest corresponds to a Dynamic Adaptive Streaming over HTTP (DASH) media presentation description (MPD) and the streaming profile corresponds to a DASH profile.

31. The method of claim 25, wherein the first streaming manifest corresponds to an HTTP Live Streaming (HLS) manifest and the streaming profile corresponds to an HLS profile.

32. The method of claim 25, wherein the first streaming manifest is a file identifying the first structures as corresponding to the second structures.

33. The method of claim 32, wherein the file identifies the first structures as corresponding to the second structures by an identifier or addressable location.

34. An apparatus for data processing, comprising:
a memory; and
at least one processor coupled to the memory and configured to:
receive, from a server at a streaming client, a bitstream associated with streaming media, wherein the bitstream comprises a first streaming manifest associated with a first streaming format, the streaming media is associated with a second streaming format different from the first streaming format, and wherein the first streaming manifest maps first structures associated with the first streaming format to second structures associated with the second streaming format, the first streaming manifest is generated based on addressable content generated in accordance with the first streaming format, and the addressable content is generated based on the streaming media;
receive, from the server at the streaming client, a profile signal identifying a streaming profile, wherein the profile signal indicates the addressable content in the first streaming format is mapped to the second structures based on a mapping between the streaming media associated with the first streaming format and the second structures conforming to a set of constraints of the first streaming format;
identify structures associated with the streaming media based on the first streaming manifest and the streaming profile; and
perform playback of the streaming media, generated according to the first streaming format, in the second streaming format instead of the first streaming format using the streaming profile, wherein the playback of the streaming media is in accordance with playback rules associated with the second streaming format.

35. The apparatus of claim 34, wherein the first structures are mapped to the second structures further based on a set of information included in the streaming profile.

36. The apparatus of claim 35, wherein the set of information includes the set of constraints.

37. The apparatus of claim 34, wherein the profile signal is included in the first streaming manifest.

38. The apparatus of claim 34, wherein the first streaming format is at least one of an encapsulation format, a packaging format, or a common media application format (CMAF).

39. The apparatus of claim 34, wherein the first streaming manifest corresponds to a Dynamic Adaptive Streaming over HTTP (DASH) media presentation description (MPD) and the streaming profile corresponds to a DASH profile.

40. The apparatus of claim 34, wherein the first streaming manifest corresponds to an HTTP Live Streaming (HLS) manifest and the streaming profile corresponds to an HLS profile.

41. The apparatus of claim 34, wherein the first streaming manifest is a file identifying the first structures as corresponding to the second structures.

42. The apparatus of claim 41, wherein the at least one processor is configured to identify, according to the file, the first structures as corresponding to the second structures by an identifier or addressable location.

* * * * *